June 30, 1959 W. F. SCHEEL 2,892,662
SHAFT BEARING MOUNTING
Filed April 3, 1953 2 Sheets-Sheet 2
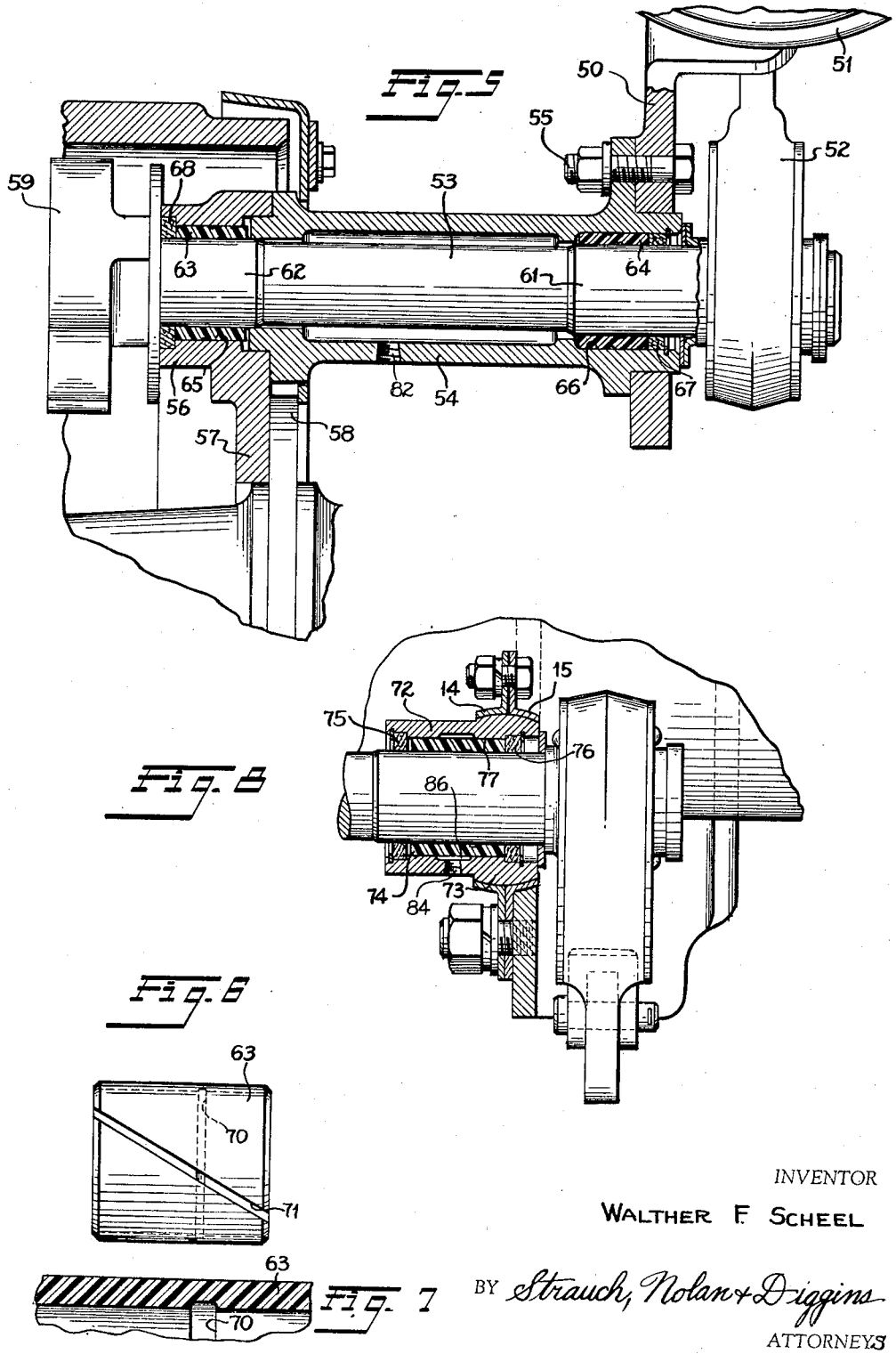
INVENTOR
WALTHER F. SCHEEL
BY Strauch, Nolan & Diggins
ATTORNEYS United States Patent Office 2,892,662
Patented June 30, 1959

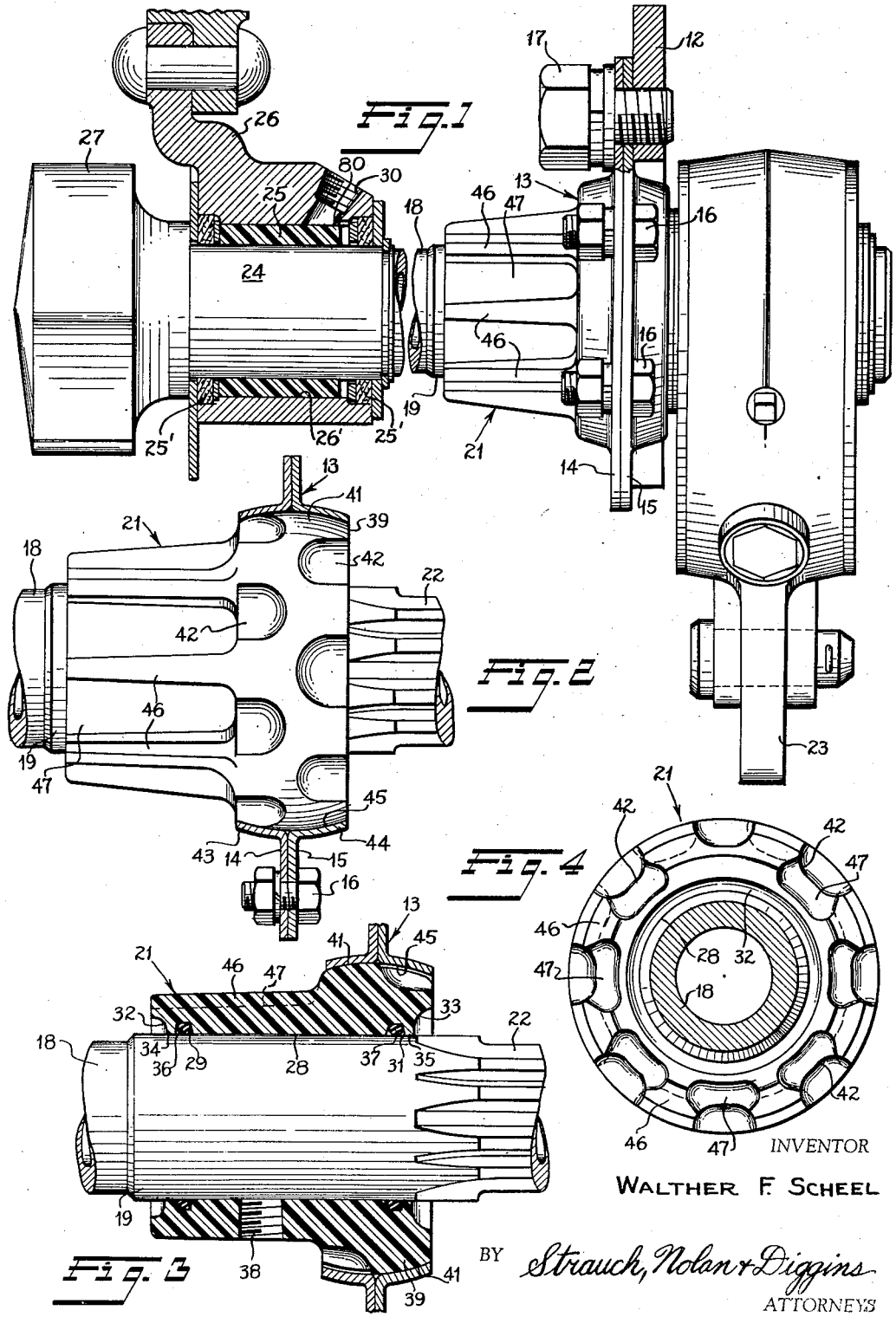

2,892,662

SHAFT BEARING MOUNTING

Walther F. Scheel, Detroit, Mich., assignor, by mesne assignments, to Rockwell-Standard Corporation, a corporation of Pennsylvania Application April 3, 1953, Serial No. 346,729

1 Claim. (Cl. 308—36.1)

This invention relates to low friction mounts for shafts and the like and particularly to special mounts of non-metallic material such as nylon.

The invention will be described in its preferred embodiments in brake and camshaft assemblies but it is capable of other uses such as king pin bushings in steering knuckles and the like.

In heavy duty automotive brakes, the cam and camshaft are usually formed into a rigid unit with spaced bearing surfaces on the camshaft journalled respectively on needle bearings in a brake mechanism mounting plate near the camhead and on needle bearings in a support collar adjacent the splined end section where the motor operated lever is attached. This support collar is usually mounted on a bracket rigid with the axle.

An example of commercial construction employing the prior art mounting of brake camshafts is disclosed in United States Letters Patent No. 2,331,652. In such constructions difficulties in operation and maintenance have been encountered due to rust and corrosion of the metal parts and even in the needle bearings when lubrication has been neglected, and particularly because of the short rotative cycle of the camshaft the individual needle bearings eventually Brinell or gall the camshaft bearing surfaces, and the needles themselves flatten after long wear. These difficulties increase under conditions of faulty lubrication, and operation in cold climates.

The invention provides a structurally simple, lightweight, highly efficient and satisfactory shaft, pin or like bearing mounting made of a non-metallic material that is tough but hard enough to be machineable and which forms an excellent bearing surface for directly supporting the shaft without the need for intermediate bearings, is inert with respect to oil, grease, water, acids and most liquids and gases encountered in an automobile, and is thermally stable so as to have no appreciable dimensional or form changes under all weather conditions. The preferable material for these mounts, which I have tested and found to satisfy such requirements, is the tough abrasive resistant polymeric amide known in the trade as nylon and described in Carothers Patent 2,071,250, but any of the synthetic plastics or polymers having the required properties will be satisfactory. Another possible material is the tetrafluoroethylene polymer known as Teflon.

It is therefore a major object of the invention to provide a novel shaft or like mount wherein the shaft is journalled directly in a bearing of abrasion resistant, tough, corrosion resistant non-metallic material that does not require lubrication to be an efficient bearing.

A further object of the invention is to provide a novel shaft or like mount of nylon or the like.

It is a further object of the invention to provide a novel shaft, pin or like mounting wherein the shaft or pin is journalled directly within the bore of a non-metallic support collar or sleeve, and resilient seal rings of normally circular cross-section mounted in internal grooves near the ends of the bore and compressed in the assembly between the shaft or pin and the support collar.

A further object of the invention is to provide a novel integral brake camshaft support collar having a smooth cylindrical internal bearing bore grooved near its opposite ends for sealing rings and having special external reenforcing ribs.

A further object of the invention is to provide a novel shaft or like bearing collar made of a non-metallic low friction material that is longitudinally split to adapt the parts into the assembly.

Further objects of the invention will presently appear as the description proceeds in connection with the appended claim and the annexed drawings wherein:

Figure 1 is a fragmentary side elevation of a brake cam and camshaft assembly wherein the camshaft is supported according to a preferred embodiment of the invention;

Figure 2 is a fragmentary view illustrating the axle mounted camshaft support of the invention partly in elevation and partly in section;

Figure 3 is a fragmentary sectional view illustrating the camshaft support of Figure 2 mainly in section;

Figure 4 is an end elevation of the support of Figure 2;

Figure 5 illustrates a further embodiment of the invention using a different type of bushing;

Figure 6 is an elevation of the split bushing used in the assembly of Figure 5;

Figure 7 is an enlarged fragmentary section of the bushing of Figure 6; and

Figure 8 illustrates a further embodiment of the invention.

Referring to Figures 1–4 of the drawings, a plate bracket 12 which is fixed as by welding upon an axle housing (not shown) supports a socket 13 made of a pair of flanged annular members 14 and 15 secured together by studs 16 and secured upon bracket 12 as by stud 17.

A brake camshaft 18 has a cylindrical bearing surface 19 near its inner end disposed in a camshaft mounting collar 21, and shaft 18 is splined at 22 beyond bearing surface 19 to receive the internally splined hub of an actuating lever 23 suitably connected to an air motor or the like.

At its other end camshaft 18 has a cylindrical bearing surface 24 directly journalled in a cylindrical bushing 25 in the brake backing plate 26 and terminates in a brake shoe operating cam 27. Bushing 25 is preferably a smooth bored cylinder of nylon which is freely rotatable with respect to bearing surface 24 and a press fit in the cylindrical bore 26' of the backing plate 26. Bushing 25 ends short of one flexible oil seal and retainer assembly 25' of a conventional type provided at the ends of bore 26' and channel 30 is provided for the flow of grease to surface 24. These retainers primarily function to prevent the entrance of dirt into the interior of the bushing. The bushing may be lubricated through a suitable fitting in opening 30.

The camshaft mounting collar 21 comprises an open ended molded hollow member also preferably integrally made of nylon.

Support collar 21 is formed internally with a cylindrical smooth bore 28, and parallel annular grooves 29 and 31 are formed in surface 28 inwardly of the ends of the bore. Beyond grooves 29 and 31 the ends of collar 21 are internally shouldered at 32 and 33, leaving continuous narrow bearing surface lands 34 and 35 respectively between the bearing surface grooves and the end shoulders.

The sides of grooves 29 and 31 are tapered so as to converge inwardly to a flat bottom. In the assembly the camshaft bearing surface 19 is journalled directly within smooth bore 28. Seal rings 36 and 37 are made preferably of an oil and age resistant elastomer like synthetic rubber, and they are of circular cross section when relaxed. When mounted in the grooves 29 and 31 in the assembly they are radially compressed between collar 21 and bearing surface 19 because their inner diameter is slightly less than surface 19. Lubricant is introduced to bearing surface 19 through a suitable fitting in radial opening 38.

Support collar 21 is formed at one end with an enlarged socket attachment flange 39 the external periphery of which consists of a surface 41 that lies in a spherical envelope, and a plurality of depressions 42 below surface 41 so spaced that surface 41 is continuous about the flange but effectively zigzags from one side to the other. The discontinuous flange surface provides adequate support with a minimum of actual contact with the metal hanger which makes assembly easier. Socket members 14 and 15 have axially extending annular rims 43 and 44 internally shaped to provide a spherical socket 45 that, when studs 16 are tight, grip surface 41 and prevent axial displacement and rotation of collar 21 with respect to bracket 12.

Since surfaces 41 and 45 are of the same contour, assembly is facilitated, relative movement between the collar and bracket being permitted until the installation is complete and then final tightening of studs 16 rigidly connects collar 21 to the bracket 13.

The exterior of collar 21 is formed with a plurality of longitudinally extending reenforcing ribs 46, illustrated as eight, which slope down from the socket attachment flange, the grooves between the ribs being indicated at 47. This ribbed construction is particularly resistant to bending and is easy to handle.

The invention therefore provides inexpensive, simple, non-metallic camshaft bearings which can be automatically made in mass production in plastic molding apparatus. The non-metallic bearing members of the invention are lighter in weight than prior bearings for the purpose and the lubricated plastic-steel bearing engagement is much more efficient than a lubricated metal bearing assembly and lasts longer. In test these nylon bearings have about four times the life of needle bearings and much greater life as compared to bronze bushings. There is no undue deformation or galling of the bearing surfaces.

Actually lubrication of these bearings of the invention is not necessary since a dry steel-plastic bearing engagement of this type will function extremely well because of the low coefficient of friction of the nylon, but lubrication is provided to keep out moisture. Even if the lubricant leaks out or runs dry the bearing action is not impaired appreciably. This is a desirable safety factor aiding in brake efficiency.

The camshaft bearings of the invention and the socket hanger are less subject to rust and corrosion than in the prior structure, and the bearings require fewer parts, which contributes to lower cost and reduced inventory.

Furthermore in practice I have found that tough plastics like nylon have valuable cold flow properties that render them useful for such bearings in that they conform themselves in size to the cooperating parts rather than wear. Thus the bearing efficiency increases with age.

During assembly of the parts collar 21, with the O-rings in place, is slipped over surface 19 and held there while the socket 13 is assembled about it. The O-rings 36 and 37, while compressed to such an extent as to prevent axial flow of lubricant out of bore 28, have little more than line contact with the bearing surface 19 and hence do not impede rotation of the camshaft. By the same token the seal rings prevent any dirt from entering bore 28.

Referring to Figures 5–8, a bracket 50 carries air motor 51 which has a piston rod (not shown) attached to lever 52 non-rotatably secured upon the end of camshaft 53. A tubular support 54 has one end piloted within an aperture in bracket 50 and is fixed to bracket 50 as by bolts 55. The other end of support 54 is piloted within the end of a boss 56 of a brake mechanism mounting spider 57 which is rigid with axle flange 58. A cam 59 like that at 27 is formed on the outer end of shaft 53. A spacing gap is allowed at the end of the support 54 pilot extension within boss 56.

Adjacent lever 52 and cam 59 shaft 53 is formed with enlarged cylindrical bearing surfaces 61 and 62, and these bearing surfaces are surrounded by similar bearing collars or sleeves 63 and 64 that are freely mounted within the bore 65 of boss 56 and a similar bore 66 in support 54 near lever 52. Suitable oil seals 67 and 68 are provided at opposite ends of the bearings. Lubricant is introduced to tubular support 54 for bearing surfaces 61 and 62 through a suitable fitting in tapped opening 82.

Bearing collars 63 and 64, as shown in Figures 6 and 7, are substantially the same, comprising a uniform thickness hollow cylinder of nylon that is formed substantially medially with a shallow internal peripheral oil groove 70. The collar is longitudinally slit from end to end preferably at an angle to its axis, and I have found that disposing slit 71 at an angle of about 30° to the axis is satisfactory but not critical. In general the slit angularity with respect to the axis may be larger as the diameter of the collar decreases and/or the collar shortens. Angular slit 71 allows the collar or nylon cylinder outside diameter to fit itself into the retaining housing.

In this embodiment of the invention the steel camshaft is directly journalled in nylon collars 63 and 64 which are directly supported in fixed bores 65 and 66 respectively. A slit collar of this type has been found to be superior to a solid nylon collar of the type shown at 25 in Figure 1, its most important advantage being that it compensates for eccentricities, irregularities and possible non-alignment of bores 65 and 66, thereby compensating for any machining and manufacturing tolerances. In operation the nylon flows under pressure to conform to the surface contours of the parts it contacts. Also since nylon may absorb moisture and expand, the slit collar compensates for expansion of the bushing in stock or after assembly. Furthermore the split collar allows for slight variations in the thickness of the bushing wall, so that the diameters of the collar need not be too accurately held in manufacture.

Figure 8 illustrates the invention as applied to a brake camshaft mount like that at the inner end of the camshaft in said Patent No. 2,331,652 and wherein the rigid tubular metal bearing support 72 which is formed at one end with a part-spherical flange 73 to be clamped in socket members 14 and 15 has an internal cylindrical bore 77 within which is disposed a cylindrical nylon collar 74 that may be the solid collar 25 of Figure 1 but is preferably a split collar like that at 64 in Figure 6. Oil seals 75 and 76 are provided at opposite ends of bore 77. Lubricant for collar 74 is introduced through a suitable fitting in tapped opening 84. Longitudinal groove 86 is provided such, and tapped opening 84 so located, when a colllar 64 as in Figure 6 is used, that lubricant will readily flow to oil groove 70 even if collar 74 is reversed end for end. Groove 86 extends sufficiently to reach oil groove 70 even if collar 74 is short with clearance at the ends and should shift to an end. If such as the solid collar 25 of Figure 1 is used with clearance at one end, groove 86 could be extended to that end similar to groove 80 of Figure 1.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In a brake actuator assembly, a brake shoe cam shaft having spaced apart bearing surfaces, one near each end thereof, and means for rotatably supporting said cam shaft at said bearing surfaces comprising a first rigidly mounted elongated tubular support concentric with said shaft and in spaced relation therewith to define an elongated annular chamber therebetween, said first tubular support surrounding one of said bearing surfaces and extending to point adjacent the other of said bearing surfaces, the portion of said annular chamber between said bearing surfaces defining a lubricant chamber for said bearing surfaces, a second rigidly mounted tubular support concentric with said shaft and in spaced relation therewith surrounding the other of said bearing surfaces to define an annular chamber therebetween, said second tubular support supporting said first tubular support, a bushing mounted on each of said bearing surfaces and occupying the annular space between said surfaces and said supports, whereby said bushings are supported directly by said tubular supports, each of said bushings being of tough, machinable non-metallic plastic material and having an internal cylindrical bearing surface closely surrounding said shaft, means for introducing lubricant under pressure to said bearing surfaces through said lubricant chamber, and means sealing the outer ends of respective ones of said tubular supports against escape of lubricant.

References Cited in the file of this patent

UNITED STATES PATENTS

| | | |
|---|---|---|
| 402,726 | Dobson | May 7, 1889 |
| 2,331,652 | Buckendale | Oct. 12, 1943 |
| 2,362,566 | Lappert | Nov. 14, 1944 |
| 2,541,790 | Sugden et al. | Feb. 13, 1951 |
| 2,609,253 | Brown | Sept. 2, 1952 |
| 2,616,771 | Metzgar | Nov. 4, 1952 |
| 2,622,949 | Cotchett | Dec. 23, 1952 |
| 2,675,283 | Thomson | Apr. 13, 1954 |

OTHER REFERENCES

Motor Magazine, page 90, October 1951.